United States Patent [19]

Nishio et al.

[11] Patent Number: 4,627,725
[45] Date of Patent: Dec. 9, 1986

[54] OPTICAL AXIS MONITORING SYSTEM

[75] Inventors: Takashi Nishio, Saitama; Tomoyoshi Ikeya, Yamanashi, both of Japan

[73] Assignee: Pioneer Electronic Corporation, Tokyo, Japan

[21] Appl. No.: 601,458

[22] Filed: Apr. 18, 1984

[30] Foreign Application Priority Data

Apr. 18, 1983 [JP] Japan .................. 58-57795[U]

[51] Int. Cl.⁴ .................. G01B 11/26; G11B 5/09
[52] U.S. Cl. .................. 356/152; 356/141; 369/46
[58] Field of Search ............ 356/152, 141, 153, 138; 369/44–46, 111, 116, 54; 250/201

[56] References Cited

U.S. PATENT DOCUMENTS

| | | | |
|---|---|---|---|
| 3,723,013 | 3/1973 | Stirland et al. | 356/152 |
| 3,925,603 | 12/1975 | Naruse et al. | 369/46 X |
| 3,942,894 | 3/1976 | Maier | 356/153 |
| 4,117,319 | 9/1978 | White, III | 356/141 X |
| 4,123,780 | 10/1978 | Honjo | 369/111 X |
| 4,146,329 | 3/1979 | King et al. | 356/153 X |
| 4,155,096 | 5/1979 | Thomas et al. | 356/152 X |
| 4,295,740 | 10/1981 | Sturges, Jr. | 356/152 |
| 4,346,994 | 8/1982 | Cruz | 356/152 |
| 4,451,863 | 5/1984 | Yanagida et al. | 369/46 X |
| 4,466,088 | 8/1984 | Trethewey | 369/111 X |
| 4,466,739 | 8/1984 | Kasner et al. | 356/153 X |
| 4,544,838 | 10/1985 | Musha et al. | 369/44 X |

Primary Examiner—Stephen C. Buczinski
Assistant Examiner—Linda J. Wallace
Attorney, Agent, or Firm—Sughrue, Mion, Zinn, Macpeak and Seas

[57] ABSTRACT

A device for monitoring the amount of deviation of a light beam in an optical system with which the freedom of design of the system is significantly improved. For each position at which the amount of deviation is to be measured, a beam splitter is provided to divide the light beam at that point into a main beam and a sub-beam. The sub-beam is applied to an optical position detector which detects the amount of deviation of the sub-beam from a predetermined position on the detector, that deviation being related to the amount of deviation of the main beam from its designated optical path. The output of the position detector is used to correct the position of the main beam.

3 Claims, 3 Drawing Figures

OPTICAL AXIS MONITORING SYSTEM

BACKGROUND OF THE INVENTION

The present invention relates to an optical axis monitoring system, and more particularly to an optical axis monitoring system for monitoring deviations in the alignment of the optical axis of a light beam in an optical apparatus.

In a conventional apparatus of this type, a light detecting element has been disposed in a path of a light beam from a light source. That is, the light beam is directly received onto a light-sensing surface of the light detecting element so that the light beam is intercepted by the light receptive element. The presence of the light detecting element directly in the optical path greatly restricts the freedom of design of the apparatus, often making it bulky.

SUMMARY OF THE INVENTION

It is an object of the present invention to provide an optical axis monitoring system arranged so that the light beam is not directly intercepted by an optical axis monitoring light receptive element to this improve the freedom of designing an optical apparatus.

Achieving the above and other objects, the invention provides an optical axis monitoring system including a beam splitter disposed in the path of a light beam emitted from a light source, and a monitor element for receiving a light beam divided by the beam splitter. Information indicative of the amount and direction of deviation of the center of the beam from the designated optical axis is provided at the output of the monitor element.

DESCRIPTION OF THE PREFERRED EMBODIMENTS

The invention will be explained by reference to the accompanying drawings.

Figure 1:
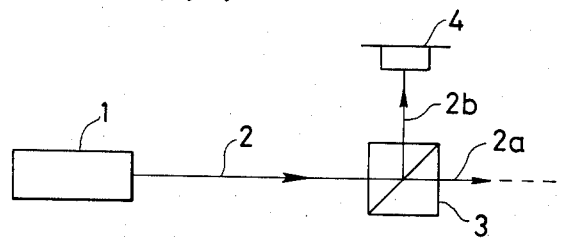
FIG. 1 is a schematic view of the operating principles of the invention.

FIG. 1 is a schematic representation explanatory of the principles of the invention. A beam 2 from a light source 1 is incident upon a beam splitter disposed in the path of the beam. The incident beam is separated by the beam splitter 3 into a main beam 2a and a sub-beam 2b. The separated sub-beam 2b, which functions as an optical axis monitoring beam, falls upon a light sensitive surface of a monitoring light detecting element 4. The main beam 20 is incident upon an optical system which includes various optical components (not shown) as required by the application at hand. Examples of such optical systems include a recording electro-optic modulation system for an optical information recording apparatus and an optical pickup system.

With the described arrangement, the path of the light beam is not blocked by the monitoring light detecting element 4, thereby increasing the freedom of designing the optical system.

Figure 2:
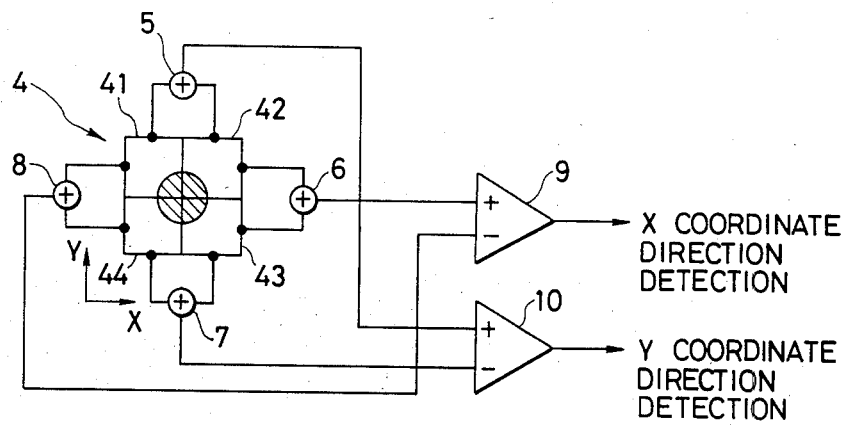
FIG. 2 is a representation showing one form of an optical monitoring circuit.

FIG. 2 is a diagram of a circuit used for obtaining information regarding the deviation of the beam from the optical axis, wherein the monitoring light detecting element is formed by a combination of four elements 41 to 44. More specifically, the light detecting element is divided by lines in the X-Y coordinate directions at right angles in a plane perpendicular to the optical axis of the light beam 2b. The elements 41, 42 and 43, 44 are arranged on upper and lower sides of the lines in the X coordinate direction, respectively. The outputs of the upper and lower elements 41, 42 and 43, 44 are added by adders 5 and 7, respectively, and the outputs of the elements 42, 43 and 41, 44 disposed on right and left sides of the line in the Y coordinate direction are added by adders 6 and 8, respectively. The outputs of the adders 6 and 8 are differenced by a subtractor 9 to detect the deviation in the X coordinate direction, and the outputs of the adders 5 and 7 are differenced by subtractor 10 to detect deviations in the Y coordinate direction.

Figure 3:
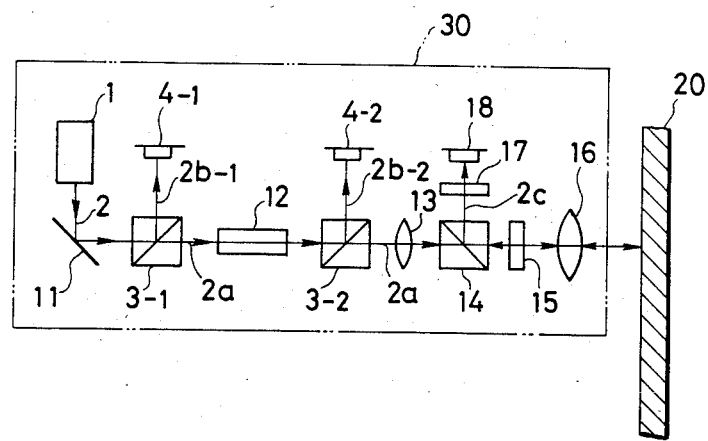
FIG. 3 is a schematic view of an embodiment of the invention.

FIG. 3 is a schematic view of an optical system for an optical information recording apparatus in which the invention is embodied. A laser beam 2 from a laser beam source 1 is reflected by a mirror 11 and applied to a first beam splitter 3-1. The beam is separated by the beam splitter 3-1 into a main beam 2a and a sub-beam 2b-1, the latter being incident upon a light sensitive surface of a first monitoring light detecting element 4-1. The main beam 2a is modulated by a signal (not shown) which contains information to be recorded by an electro-optic modulator 12, and is then passed to a second beam splitter 3-2. The main beam is again separated by the beam splitter 3-2 into a main beam 2a and a sub-beam 2b-2, the latter being incident upon a second monitoring light detecting element 4-2.

The main beam 2a then passes through a diverging lens 13 and is applied to a polarizing beam splitter 14. The main beam incident upon the beam splitter 14 is rotated in polarization by a quarter-wave plate 15. The output beam of the quarter-wave plate 15 is directed by an objective lens 16 upon a recording surface of a recording disc 28. The light reflected from the recording surface is directed by the lens 16 and the quarter-wave plate 15 to the beam splitter 14. The polarization of the reflected light is rotated by the beam splitter through an angle of 90°. The resultant beam is then directed by a cylindrical lens 17 to a light detecting element 18. The position of the objective lens 16 in the direction perpendicular to the disc 20 is controlled by the output of the light detecting element 18 so that the recording beam is prevented from being defocused by warp or the like of the disc 20, thus effecting a so-called focus-servo operation so as to cause the beam to be properly converged on the recording surface at all times.

With such an arrangement, the optical axis of the main beam 2a is made to always coincide with the designated optical axis by the use of the outputs each of the two monitoring light detecting elements 4-1 and 4-2 in the case where, for instance, variations are involved in the optical axis of the laser beam 1 or the laser is replaced. In such an instance, the beam may be aligned with the designated optical axis by adjusting only the mirror 11 or the source 1, whereas changes in the locations each of components of the optical apparatus 30 require no adjustment.

In this embodiment, optical axis monitors are disposed in two positions in the main beam path to detect deviations from the designated optical axis by the beam. The use of more than two optical axis monitors assures better tolerances. The monitors may be arranged in any position and are not limited to the positions shown so long as they are in the optical path of the main beam. One optical axis monitor may be used for two or more positions if required.

Although four split-type monitoring light detecting elements are used in the above embodiment, any arrangement may be employed if it is capable of detecting beam positions in a plane perpendicular to the optical axis. Although the invention has been described with reference to an optical information recording apparatus, it may also be embodied in an optical information reproducing apparatus.

As set forth hereinbefore, according to the invention, deviation from the designated optical axis may be monitored without intercepting the path of the light beam, thus improving the freedom of optical system design. Further, if optical axis monitoring is made at at least two positions, deviations which occurs over time or which are due to exchange of the light source and the like may be accurately detected and corrected. In addition, adjustment for such corrections may be simplified.

What is claimed is:

1. In an optical information recording apparatus for optically recording information on a recording surface of a record member comprising:
    a laser beam source providing a laser beam directed onto said surface,
    an electro-optical modulator positioned between said source and said surface and intercepting said beam to modulate said beam,
    the improvement comprising:
    a first beam splitter positioned in the path of said light beam downstream of said source and upstream of said modulator separating said beam into a main beam and a first sub-beam,
    a first monitoring light detector element positioned in the path of said sub-beam,
    a second beam splitter positioned in the path of said main beam downstream of said modulator further separating said main beam and forming a second sub-beam,
    a second monitoring light detecting element positioned in the path of said second sub-beam,
    a polarizing beam splitter positioned in the path of said main beam downstream of said second beam splitter and including a quarter-waveplate for rotating the main beam incident on said recording surface,
    a lens interposed between said polarizing beam splitter quarter-waveplate and said recording surface for reflecting light from said recording surface to said polarizing beam splitter through said quarter-waveplate, such that the reflected light is rotated by the beam splitter through a given angle,
    and wherein said polarizing beam splitter separates said reflected polarized light beam into a main reflected polarized light beam, and a polarized reflected light sub-beam, and
    a polarized light sub-beam light detecting element positioned in the path of said polarized reflected light sub-beam;
    whereby, an output signal is developed by the polarized light sub-beam detector element for controlling the position of the objective lens in a direction perpendicular to the recording surface so that the main recording light beam is prevented from being defocused by warpage of the recording surface under focus-servo operation, recording beam convergence is maintained on the recording surface at all time, and the optical axis of the main beam is maintained coincident with the designated optical axis by comparing the output signals of the two monitoring light detecting elements and permitting optical axis alignment with the designated optical adjustment solely by adjusting the laser beam source and without further adjustment of the balance of the components of the optical information recording apparatus.

2. The system as claimed in claim 1, further comprising a diverging lens downstream of said second beam splitter and upstream of said polarizing beam splitter and in the path of said main beam.

3. The system as claimed in claim 2, further comprising a cylindrical lens positioned between said polarizing beam splitter and said polarized light sub-beam light detecting element for focussing said polarized reflective light sub-beam on said polarized light sub-beam light detecting element.

* * * * *